Oct. 24, 1950 S. FOSTER ET AL 2,526,647
FILM GATE AND MOUNTING THEREOF
Filed Sept. 30, 1948 2 Sheets-Sheet 2
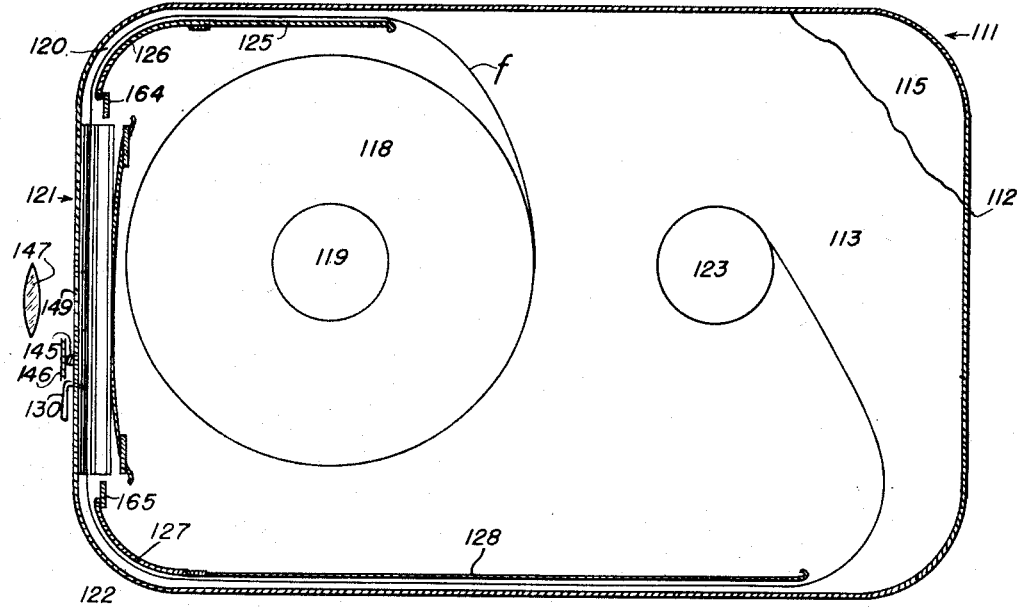
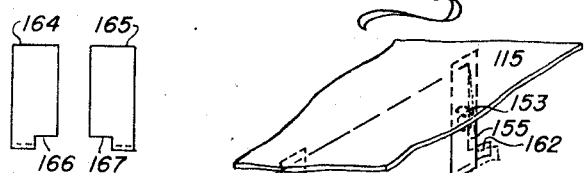
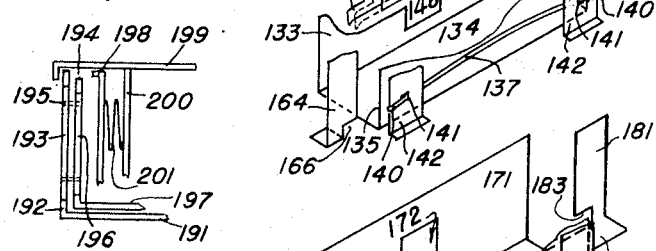
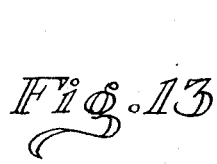
Inventor
Sigrid Foster
Warren Dunham Foster
By Warren Dunham Foster
Attorney Patented Oct. 24, 1950

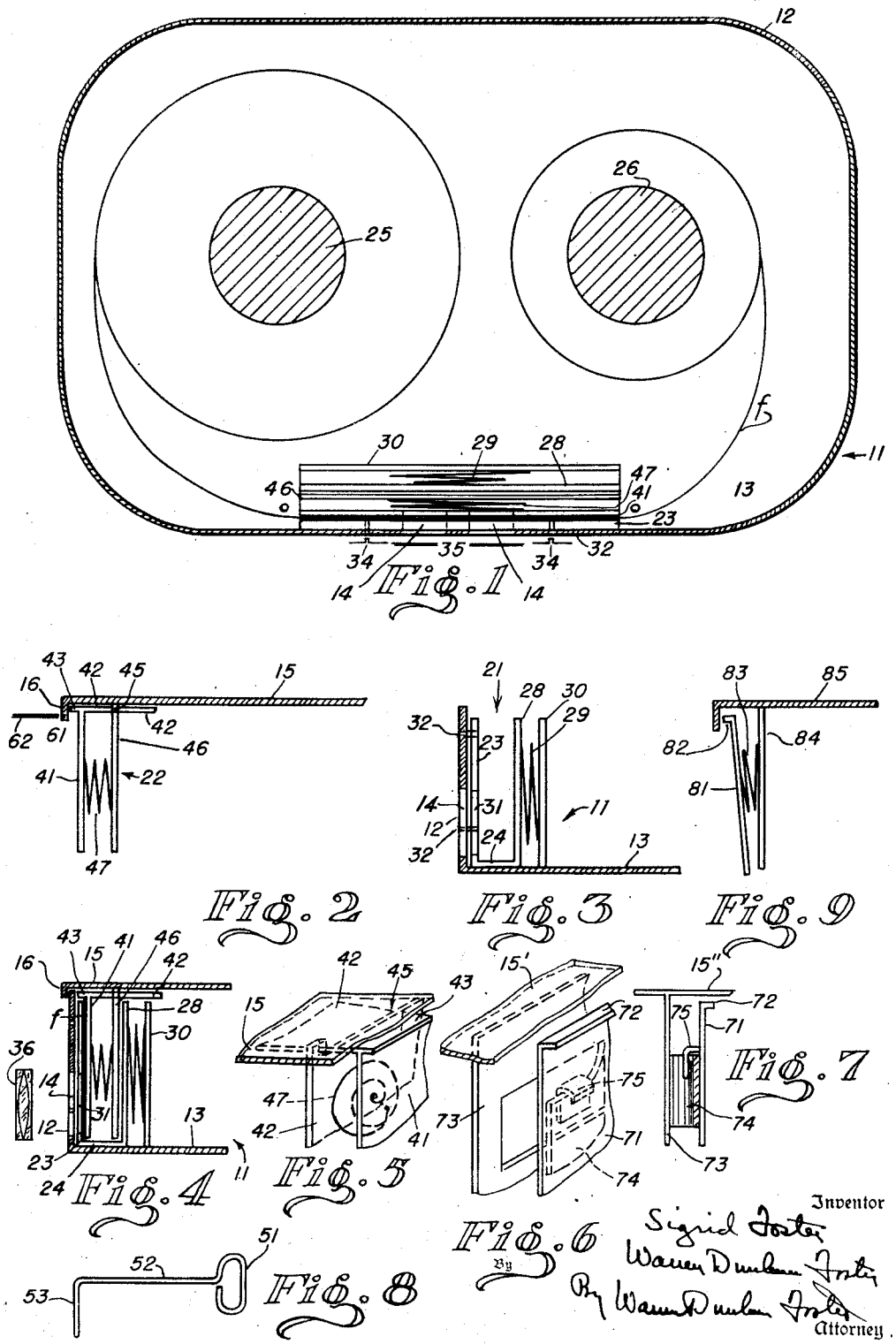

2,526,647

UNITED STATES PATENT OFFICE 2,526,647

FILM GATE AND MOUNTING THEREOF

Sigrid Foster and Warren Dunham Foster, Eustis, Fla., assignors, by direct and mesne assignments, to Foster and Foster, Ridgewood, N. J., a copartnership Application September 30, 1948, Serial No. 51,888

44 Claims. (Cl. 88—17)

1

Our invention comprises an improved film gate particularly adapted for use in an enclosed space as in a film containing magazine or in a film receiving compartment of a film handling apparatus. This gate is well suited for use with amateur motion picture apparatus with films of less than theatrical width but its utility is not so limited. The use of this gate within a film magazine or other enclosure makes possible the almost instant threading of a fresh film with a minimum likelihood of error and resulting damage to the film. Our novel film gate is sturdy, inexpensive and simple, and maintains a film in the focal plane of the lens of an apparatus with which it is used during its exposure or projection.

According to this invention one element of our gate is mounted upon one member of an enclosure, for example a body or main member of a magazine, and the other upon the other member, as a cover member. Similarly, one element may be mounted upon the door of a film receiving compartment of a motion picture camera, and the other element within the compartment. We illustrate our invention, however, as applied to a film magazine. To place a film in operative position a workman at a film factory or a distributing center merely lays a fresh film in a film channel which we provide in the body member of a magazine and attaches its leading end to a take-up support. This operation disposes the film along the inner face of an apertured gate plate. Then he places the cover member upon the body member. A presser gate plate is so disposed upon the cover member that the act of completing the assembly of the container positions the two gate plates in operative relation to each other and to the film therebetween. The entire assembly operation, including the placing of a fresh film in position, requires literally only a few seconds and can be easily carried out in absolute darkness as is required with many modern types of films. Particular skill and special guages are not required.

A very important characteristic of our invention is the provision of entirely separate main supports for each gate element. An apertured or front gate plate is mounted upon a body member of a magazine or other container for a film and a presser or rear gate plate is mounted upon a cover member. One support is in no way dependent upon the other and during operation one is not conditioned by the mounting of the other. As a result assembly is made very much quicker and easier and after

2 assembly the resilience of one gate plate can not have an adverse effect upon the other plate.

According to a preferred form of our invention, the forward or apertured gate plate may be in the form of the letter U, the front and apertured upright of which is disposed adjacent a front apertured edge wall of a magazine or other enclosure and furnishes in its rearward surface, that relatively remote from a lens, a film-contacting guide. A portion representing the cross bar of the U and extending rearwardly parallel to and adjacent the bottom side of the film compartment serves both as a support and a lower edge guide for a film. A rearward upwardly extending portion representing the other leg of the U is substantially co-extensive with the front or apertured portion, as well as parallel thereto, and serves as an area of contact for a spring which moves this gate member forwardly toward the lens. According to well known laws of physics its resilience is distributed throughout the entire portion of the forward gate section. If this gate is applied to a magazine, either a lug or button or pins extending forwardly from the forward leg of the U may be engaged by a portion or portions of the apparatus with which our magazine is used properly to position the film contacting surface in the focal plane of the lens. If our gate is used in conjunction with the Morsbach film tensioning and guiding channels, later defined and described, as we much prefer for many purposes, this U form establishes a continuation of these channels and hence further facilitates threading.

A rear or presser gate plate which co-acts with the film engaging portion of the front gate plate is resiliently mounted upon a cover member and with its resilient mounting is included within the open portion of the U when the two container members are in assembled relation. This gate plate is literally suspended, and entirely independent of the front plate.

According to one important embodiment of this invention we both support and give resilience to one of the gate plates, generally the presser plate, by means of a single leaf spring. Hook shaped instrumentalities bent out of the body of the spring co-act with appropriate formations upon the side of the gate plate opposite that which bears against the film to hold it in position and give it resilience entirely independently of any other part of the apparatus.

Our invention may be applied to a gate wherein a front or apertured member is rigidly mounted.

The assembly of the two members of a container making use of our gate may be carried out without special devices or tools. Under certain conditions we prefer to add simple guides or positioning posts, if desired as a part of one of the gate plates, which prevent the possibility of conflict between a gate plate and the film during this operation. Alternatively a very simple tool may be used, although ordinarily it is not necessary.

We are not limited to the particular details of gate structure shown herein. Reference is hereby made to the application of Warren Dunham Foster, Serial Number 108,122, filed August 2, 1949, as a continuation-in-part hereof, which discloses certain subject matter disclosed herein.

Other objects, advantages and characteristics of this invention will be clear from the above generalized portion of this specification, the detailed description which follows, the subjoined claims and the accompanying drawings. Although we are showing only preferred forms of our invention for purposes of illustration it will be understood that changes can readily be made without departing from the scope of our broader claims or the spirit of our invention.

For certainty, simplicity and brevity we are using certain terms in this specification and the subjoined claims with the following meanings: The "front" of a magazine or other compartment or a part thereof is considered to be that portion which is disposed toward the lens of a camera when the magazine is in use therein. "Side" walls are the parallel, broad and flat walls of the magazine which are joined by "edge" walls which are narrow. A "top" edge wall is that which is upper most and horizontal when an ordinary camera and magazine (or film compartment) are held in picture taking position. "Bottom" or "lower" as applied to a side wall is that which is closer to the drive when the magazine is in its receptacle in the camera. The orientation of the film follows that of adjacent parts of the magazine. Other related words and anonyms are used with consistent meanings. A "gate" is a combination of guides which in its area of exposure maintains a film centered and in the focal plane of a lens with which the film is being used. It consists of a forward or apertured plate, which determines this focal plane, and a rear or presser plate which resiliently holds a moving film in this plane. A "container" employed alone in the subjoined claims includes that of a film magazine or a compartment of a film handling apparatus having a cover for the reception of a film upon spools.

In the drawings:

Figure 1 is a transverse horizontal sectional view of the invention as applied to a magazine of a type which is known as a "double eight," with the magazine lying on its bottom side, and about to be moved to completely operative position.

Figure 2 is a vertical sectional view showing a rear or presser gate plate which according to this invention is preferably attached to one of the members of a container, here shown as a top cover.

Figure 3 is a sectional view corresponding to Figure 2 but showing a forward or apertured gate plate which is supported by the other member of the container, in this instance a lower or body member.

Figure 4 is a combination of the subject matter of Figures 2 and 3 and shows the gate of our invention in operative position with a film maintained in the focal plane of a lens.

Figure 5 is an enlarged fragmentary detail of one means for mounting a rear or presser gate plate.

Figures 6 and 7 are enlarged fragmentary views which show a modification wherein a single spring furnishes the resilience necessary for a rear or presser gate plate and also supports it, from a cover of a magazine. Figure 6 is a perspective and Figure 7 a corresponding section.

Figure 8 shows a tool which under certain conditions may be employed following the insertion of a fresh film in this magazine.

Figure 9 corresponds to Figure 2 but shows a modification of that structure.

Figures 10 to 14 both inclusive show a modification of our invention applied to a magazine of a basic type which is known by the United States Government as the AN-A-6. It accommodates a sixteen millimeter film. This modification is characterized by a device which facilitates the assembly of the two parts of the container by guiding a rear or presser gate plate away from a film placed along the apertured gate plate as the two body members are assembled.

Figure 10 is a transverse sectional view of such a magazine with its cover removed and generally corresponding to Figure 1.

Figure 11 is a fragmentary elevation showing positioning posts for facilitating the assembly of a container with which this embodiment of our invention is used.

Figure 12 is a perspective view of this modified gate structure.

Figure 13 is a view of a modification of this embodiment of our invention wherein the positioning posts, which in the form of Figures 11 and 12 are shown as independent, are integral with a forward or apertured gate section.

Figure 14 shows a modified gate wherein a front aperture is fixed.

In all of the drawings the spacing of the elements of the gate and that of such elements and adjacent portions of the magazine are very much exaggerated for purposes of clarity.

We first illustrate this invention as applied to a magazine of a well known "double eight" type. See Figure 1. Such a magazine comprises a bottom container generally indicated as 11 with edge walls 12 extending at right angles from the periphery of a bottom or lower wall or floor 13; one edge wall having two apertures 14. The container of the magazine is completed by a cover member 15 with flanges 16 depending therefrom. If desired in this and other embodiments of this invention the construction of the outer container may follow the teaching of the co-pending application of Warren Dunham Foster and Oliver Whitwell Wilson, Serial Number 7,926, filed February 12, 1948, with the edge walls extending from the cover member. Since the outer container forms no part of the present invention except for its supporting function it is not presented in detail.

In its essence this invention comprises a novel gate, including supports therefor. This gate includes a front or apertured plate generally indicated as 21 (shown alone in Figure 3) and a rear or presser plate generally indicated as 22 (shown alone in Figure 2). The apertured plate is presented in the first embodiment of this invention as resiliently supported by the bottom member of the container and the presser plate as resiliently supported by the cover member of the container. The advantages of such a construction have already been outlined and will more fully appear as this description continues.

The forward gate plate generally resembles the letter U. It includes a film contacting surface 23, which forms an upright leg of the U, a rearwardly extending cross bar 24, which acts as a lower edge guide for the film as it travels between a delivery support 25 and a take-up support 26, and a rearward upright leg 28 which is engaged by a positioning spring 29. The other end of this spring is supported by an upright post or wall 30 which is fastened as by spot welding to the bottom side or floor 13 of the magazine. Alternatively a leaf spring may be employed. An aperture 31 is formed in the front upright. It will be noted that the rear upright leg 28 of the U is of substantially the same size as the forward or film engaging portion 23. Thus the leverage of spring 29 is equally applied to all parts of the film engaging surface. Forwardly extending pins 32 not only assist in the positioning of this U-shaped or front gate member when the magazine is not in use but also co-act with pins 34 extending backwardly from a wall 35 of a magazine receiving compartment of a camera not otherwise shown. (Figure 1.) Co-action between these pins, respectively mounted upon the camera and the magazine, results in the positioning of film engaging surface 23 in the focal plane of a lens indicated conventionally as 36 of the apparatus.

In the form of the invention shown in Figures 1, 2, 4 and 5 the rearward or presser gate plate attached to the cover of the magazine comprises essentially a film engaging depending surface 41 which is roughly T-shaped, with the rearward cross bar much longer than the forward. The long rearward portion 42 of the cross bar of the T serves as a guide and support for the plate and the oppositely extending forward portion 43 engages the upper edge of a film as it travels through the gate and hence acts as an upper edge guide. This support 42 passes through an open space 45 in a depending bracket 46 just below the point at which it is spot welded or otherwise attached to the cover 15. A spring 47, shown as a spiral although a leaf spring may well be substituted, extends from this bracket forwardly to engage the rear side of this depending presser gate plate.

We may use the Morsbach improvement of the Bundick and Proctor tension control system of feeding, both illustrated and described in connection with the embodiment of our invention as shown on sheet two. This spring may be attached as by spot welding or as by the insertion of a portion of an end in a small hole drilled within the depending bracket.

By reason of this construction it will be seen that this rear gate section is held firmly in place and at the same time is guided toward and away from the film and subjected to resilient pressure. Spring 29 is much stronger than spring 47. Both work in the same direction. Once the magazine is positioned within a camera spring 47 controls the pressure applied to the film during its travel while spring 29 determines its position in the focal plane.

One alternative form of this support is shown in Figures 6 and 7 and in Figure 9.

Placing a fresh film into position in this magazine and the closing of the cover is very simple. A fresh roll is first placed about delivery support 25 and the leading portion of the film dropped within the open U of the lower gate plate and the leading end attached to take-up support 26. This operation is almost instantaneous. Thereupon the cover with the depending gate section 41 in position is placed upon the body of the magazine. At this time spring 47 of course moves this back gate section forwardly to a position substantially aligned with that occupied by the upstanding film contacting portion 23 of the forward gate. Ordinarily in order to prevent conflict all that an operator must do is simply to tilt the back of the cover slightly forwardly as he begins to assemble the container. That is, the forward end is held lower than the rearward end. As the cover is moved downwardly this angular contact between the presser gate plate and the forward gate plate cams the gate plates away from each other and the film therebetween. As a matter of fact, it is the rear plate which moves slightly inwardly until the parts have slipped into place. This entire operation takes a very few seconds only. Alternatively a simple tool such as that shown in Figure 8 may be applied to the rear gate plate to press it from the front leg of the U. This tool consists of a bent wire, embodying a handle portion 51, a main shank 52 and a bent-over gate contacting portion 53. By means of this or a similar tool an operator merely collapses spring 47 and moves the gate plate 41 to a position adjacent bracket 46. He then slips the cover into position and when it is almost in place removes the tool.

Figure 2 shows an expedient which in exceptional circumstances may be used but ordinarily is not necessary. A very small hole 61 is drilled through flange 16 in line with the upper portion of movable gate plate 41. A piano wire 62 introduced through this opening is used to force movable gate plate 41 backwardly during the first part of the assembly operation. As the two container members are almost joined the wire is withdrawn and the hole sealed, either by special means or merely by the tape which is conventionally employed to seal the two container members together.

Figures 6 and 7 show a modified and important device for mounting a rear or presser gate plate. Plate 71 includes an edge guide 72 which extends forwardly. In this instance a single leaf spring 73 is attached to a cover member 15' and extends downwardly therefrom generally in the position occupied by bracket 46 in the embodiment previously described. A plurality of sections 74 of this spring are cut out and bent toward the lens (to the right as viewed in Figures 6 and 7) so that they engage the rearward or leftward portion as shown in those figures of the adjacent side of gate section 71, this being the rearward side opposite that which engages the film. A hook 75 is attached in any convenient manner as for example by spot welding to the rear or adjacent side of this gate plate. As can readily be seen by inspection of Figures 6 and 7 the gate section 71 is then merely hooked into place over these projections. Thereby this one element both resiliently presses the rear gate plate toward the forward or apertured gate plate and the lens and supports it.

As is clearly shown in Figure 9, we may supply a variant of this construction wherein a presser gate plate is supported by a spring of greater expansion than those previously shown so that when it is not under tension by the engagement of a presser plate with an apertured gate plate the lower end of the plate tends by its own weight to move slightly toward the interior of the magazine. Thus, as is shown in Figure 9 in a form much exaggerated for clarity, edge guide 82 is supported by such a spring 83 attached to a bracket 84 which depends from the inside surface of a top container member 85. As this structure is added to that of Figure 3 for example it will readily be understood that the lower edge of gate plate 81 will pass to the right of front aperture gate plate 23 and a film which may be disposed adjacent thereto. When the container is completely closed, however, a top portion 23 of the fixed gate plate will bear against the upper portion of the presser plate 81 and straighten it out so that the two plates are held in parallel relation.

In Figures 10 to 14 both inclusive we illustrate this invention as applied to a magazine designed to accommodate 16 millimeter film and of the general shape of that designated by the United States Government in the second world war as AN–A–6 and like that magazine embodying the Morsbach improvements of the Bundick and Proctor tension control system of feeding. Such a magazine comprises a bottom member or container generally designated as 111. Edge walls 112 extend upwardly therefrom at right angles thereto. A cover member 115 completes the container. A film f passes from a delivery mass 118, wound upon a delivery support 119, through a delivery channel 120, a gate generally indicated as 121 and a take-up channel 122 to a take-up spindle or support 123 which is driven in any conventional manner by a friction clutch, conventional and not shown, from a power take off of a camera. The construction of the drive shown in the said Foster and Wilson co-pending application or in the various applications to which reference is made therein may be employed. The delivery channel is formed upon its outer side by a wall 112 of the magazine and upon its inner side by a tensioning arm 125 and a fixed guide 126. The take-up channel is formed likewise by an outside wall of the magazine, a fixed take-up guide 127 and a resilient tensioning arm 128. As is explained in the Morsbach Patents 2,159,998 dated May 30, 1939, and 2,175,538 dated October 10, 1939, these arms furnish compensation for the difference in character of movement of the continuously operating delivery and take-up masses and an intermittent pull-down by vibrating in step with a pull-down, indicated as 130, according to the Bundick and Proctor system as fully set out in Patent Number 1,944,022, dated January 16, 1934, and 2,036,918, dated April 7, 1936, and others of the same group. In Figure 10 it is assumed that the pull-down and take-up have not yet begun to operate. Consequently the film is shown as slack, in those sections between the delivery and take-up channels and the respective adjacent supports.

In its basis gate 121 of this form of the invention is closely similar to that previously described, but it includes mechanism which makes certain that the assembly of the two members of the container will be most simple and easy. Guiding posts are supplied which during the assembly of the gate cam the presser plate backwardly and space it from a film in contact with a front or apertured gate plate until the two plates are in alignment. This forward gate plate, like that previously described, generally resembles the letter U. It includes a front and apertured film contacting surface 133 which in the form of an upstanding leg of the U, a rearwardly extending section 134 which represents the cross bar of the U and acts as a lower edge guide for the film as well as a support for a rearward upright leg 135 with which a positioning spring 137 engages. This spring is shown as a leaf spring with tongues 140 which are snapped within openings 141 in posts 142, which are fastened in any appropriate manner as by spot welding or swedging to the bottom side or floor 113 of the container of the magazine. A positioning lug 145 extends forwardly through the front edge wall of the lower member of the container and makes contact with a fixed surface 146 of a magazine receiving receptacle of a camera (Figure 10). By reason of this construction it is evident that the film contacting surface 133 which represents the focal plane of a lens 147 of the camera will be determined by coaction between a surface of the camera and the gate mechanism. Aperture 148 of the film contacting surface of the U gate plate is in alignment with a similar aperture 149 of the front edge wall.

A rear or presser plate 151 similar to plate 46 of the first described embodiment of this invention is shown as supported upon springs 152 and 153 which are respectively attached to brackets 154 and 155 which depend from the inside surface of the top side of the cover 115 of the magazine and thereby both support and give resilience to this presser gate plate. Since the exact method of support of this gate plate need not vary from that previously described there is no need for further discussion or illustration. The support shown in Figures 6 and 7 and previously described may well be employed.

A distinctive element of this embodiment of this invention includes two prongs or tongues 161 and 162 which extend away from the body of this rear or presser gate plate near the bottom edge thereof and are bent slightly backwardly. To coact with these tongues we supply two positioning posts 164 and 165 which in Figures 10, 11 and 12 are fixedly attached to the bottom wall 113 of the body of the container. Notches 166 and 167 to accommodate tongues 161 and 162 are cut in these posts adjacent their lower edges.

The operation of this form of our invention will be clear from the foregoing portion of the description and Figure 12. When a fresh film is to be inserted in a magazine, it is merely laid from one support to the other through the delivery and take-up channels and the open U of the front gate plate, with the leading end attached to the take-up support 123. This operation, even when carried out in complete darkness or with a dim safe light, takes a very few seconds, with a minimum of skill and no likelihood of error. As an assembler joins the top and bottom members of the magazine he places prongs 161 and 162 of the rear gate plate back of the tops of positioning posts 164 and 165, or to the right as viewed in Figure 12. He then moves the cover member forwardly until its front wall is aligned with the front wall of the lower or body member. The position assumed by this rear gate plate is indicated by the dotted lines of Figure 12. As the two members of the container are moved relatively toward each other and the closed position the rear or presser plate 151 is maintained well away from the film f which is passing along the back or rearward face as viewed in Figure 12 of front gate plate 133. When, however, the tongues 161 and 162 reach the notches 166 and 167 springs 152 and 153 snap the gate section 151 into contact with the film. Tongues 161 and 162 are bent slightly backwardly to prevent engagement with a film while it is being fed. This entire assembly operation requires a very few seconds only, and highly skilled labor with expensive guages is not needed. Since each magazine, if it embodies the tension control system instead of a sprocket, is so sturdy that it can be filled many times during its life, this saving in time of assembly is most important.

An important modification of this form of the invention is shown in Figure 13. In this instance the posts for cooperation with the tongues 161—2 are made integral with the U-shaped front gate member.

This form of the gate includes a film contacting front upright leg 171 with a central aperture 172, a rearwardly extending edge guiding and supporting surface 173 corresponding to the cross bar of the U, and an upwardly extending rear portion 174 with which a spring 175 co-acts in the manner previously described. This cross-bar portion, which is parallel to the floor 113 of the magazine when the two are assembled, has lateral extensions in the same plane in the form of two tongues 178 and 179 which are turned upwardly to form posts 180 and 181 which include notches 182 and 183. The operation of this modification of this embodiment of our invention is similar to that previously described.

Our invention has been described up to this point as applied only to a gate the front or apertured section of which is movable. It is not so limited, as will be observed from Figure 14. This front gate plate may be fixed to one body member of the container and not movable in relation thereto while the other gate section may be supported resiliently from the other member of the container. As shown in that figure a body member has a bottom side or floor 191 and an upstanding edge wall 192 apertured at 193 and fixedly supporting as by rivets or screws 195 a fixed gate section 194, likewise having an aperture 196 and a backwardly extending lower edge guiding section 197. The rear or presser gate plate 198 depends from top wall 199 of the cover member of the container by a bracket 200 to which it is attached by a spring 201. Positioning posts similar to 165 and 166 or 180 and 181 may be supplied if desired. The operation of this form of the invention is as previously described.

We have described our invention as applied to a container of a magazine, but it is equally well adapted to use with any film containing compartment having a cover. In such an apparatus one gate member is attached to the cover and the other to the floor of the container. In this instance the front or apertured gate plate is fixed, as in Figure 14.

The advantages of our invention will be clear from the foregoing portion of this specification, the sub-joined claims and the attached drawings. They include the provision of a novel gate which is particularly well adapted for a motion picture magazine, one film contacting gate plate being attached to one body member of the container and the other portion to the other member, with provision for maintaining these two plates in properly spaced relation to each other during the assembly of the container. Features of this gate result in simplicity of construction and greatly reduced time and cost of insertion of a fresh film, as well as efficient operation.

We claim:

1. In a film container comprising a body member and a cover member, a two-plate gate, means for mounting one of said gate plates upon one of said members, and means for mounting the other of said gate plates upon the other of said members, said mounting means being so disposed that a first portion of the movement of said members into assembled relation moves said gate plates apart and a concluding portion thereof positions said plates in operative relation to each other and to a film therebetween.

2. In a film container comprising a body member and a cover member, a front or apertured gate plate, a rear or presser gate plate, means for mounting one of said plates upon one of said body members, and means for mounting the other of said plates upon the other of said members, at least one of said mounting means being resilient and said mounting means being so disposed that when said container is assembled by the joining of said body members said gate plates are first moved and held apart and thereafter are positioned in operative relation to each other and to a film therebetween.

3. In an interchangeable film magazine for successive use in a plurality of different apparatus and having a body member and a cover member which when assembled form a complete protective enclosure for a film, said enclosure having two sides held in spaced parallelism by abutting edge walls, a first gate plate, a mount for said gate plate upon the inside surface of the side of one of said members therewithin, a second gate plate, a resilient mount for said second gate plate upon the inside surface of the other of said members, said mounts being so disposed that when said container is assembled said gate plates extend from said surfaces in a direction normal thereto and parallel to each other and are disposed in operative relation to each other and to a film therebetween.

4. In a film magazine constructed for interchangeable use in a plurality of different film handling apparatus, a container having two members, one of said members including a flat side wall and edge walls extending at right angles therefrom, one of said edge walls having an aperture, another of said members being adapted to complete a protective enclosure of a film within said magazine, said members being of substantially the same shape and one being adapted to slide within another, a delivery support for a film, a take-up support for the film, a first film guiding surface adjacent said apertured edge wall and having an aperture in alignment with its aperture, the film passing within the magazine from said delivery support to said take-up support along said gate surface and past the aperture thereof, a presser gate plate, and a resilient support for said presser gate plate disposed upon said other member of said container and effective to move said presser plate toward a film in operative relation to said film guiding surface, said resilient support being so placed upon said other member that when said members are joined to complete the enclosure of said container said gate plates are disposed in operative and parallel relation to each other and a film therebetween.

5. In a magazine for interchangeable use in any of a plurality of different film handling apparatus, said magazine including a container having a body member and a cover member which when they are closed are disposed immediately adjacent the edges of the film and form a protective container therefor complete except for an exposure or projection aperture, a support extending toward the interior of the magazine from one of said members in a direction normal to its flat side, a support extending from the other of said members toward the interior of the magazine in a direction normal to its flat side, a first gate plate, means for mounting said first gate plate upon one of said supports, and means for resiliently mounting the other of said gate plates upon the other of said supports, said supports being so disposed upon said members that they are spaced from each other when said container is closed and said gate plates are positioned in operative relation to each other and a film therebetween.

6. In an interchangeable film magazine for successive use in a plurality of different apparatus and having a body member and a cover member which when assembled form a complete protective enclosure for a film within which it can be stored, shipped and inserted within said apparatus, said enclosure having two side walls held in spaced parallelism by abutting edge walls, a first gate plate, a mount for said gate plate upon the inside surface of the side wall of one of said members therewithin and adjacent an edge wall, said first gate plate when so mounted extending away from said side parallel to said edge wall, a second gate plate, and a mount for said second plate upon the inside surface of the side of the other of said members therewithin, said second gate plate when so mounted extending away from said side wall in a direction toward said other gate plate and parallel thereto and normal to the side wall upon which it is mounted.

7. In an interchangeable film magazine for successive use in a plurality of different apparatus and having a body member and a cover member which when assembled form a complete protective enclosure for a film within which it can be stored, shipped and inserted within said apparatus, said enclosure having two side walls held in spaced parallelism by abutting edge walls, a first gate plate, a mount for said first gate plate on one of said members for holding it parallel and adjacent to an edge wall of said enclosure when so completed, a second gate plate, and a mount for said second gate plate on the other of said members which holds said second gate plate in a position parallel to and adjacent said first gate plate when said enclosure is so completed by the assembly of said members.

8. In a film magazine, a body member and a cover member which when assembled form a container for protecting a film therewithin, said container having side walls held in spaced parallelism by edge walls, one of said edge walls being apertured, a first and apertured gate plate, a resilient mount for said gate plate disposed upon the inside of the side wall of one of said container members adjacent said apertured wall and effective to move said first gate plate toward said aperture in said edge wall of said member, a second or presser gate plate, and a resilient mount for said second plate disposed upon the interior of said side wall of said other member and effective to move said second gate plate toward said first gate plate when said members are in assembled relation, said resilient mounts being so disposed that when said container is assembled said gate plates are positioned in operative relation to each other and to a film therebetween, the resilience of the mount for said apertured gate plate being greater than that of said other mount.

9. In a film magazine, a body member and a cover member which when assembled form a container for protecting a film therewithin, said container having side walls held in spaced parallelism by edge walls, one of said edge walls being apertured, a first and apertured gate plate, a resilient mount for said gate plate disposed upon the inside of the side wall of one of said container members adjacent said apertured wall with said apertures in line and effective to move said first gate plate toward said aperture in said edge wall of said member, a second or presser gate plate, and a resilient mount for said second gate plate disposed upon the interior of said side wall of said other member and effective to move said second gate plate toward said first gate plate when said members are in assembled relation, said resilient mounts being so disposed that when said container is assembled said gate plates are positioned in operative relation to each other and a film therebetween, the resilience of the mount for one of said gate plates being greater than that of said other mount.

10. In a film magazine, a body member and a cover member which when assembled form a container for protecting a film therewithin, said container having side walls held in spaced parallelism by edge walls, one of said edge walls being apertured, a first and apertured gate plate, a fixed mount for said gate plate disposed upon the inside of the side wall of one of said container members adjacent said apertured wall with said apertures in line, a second or presser gate plate, and a resilient mount for said second plate disposed upon the interior of said side wall of said other member and effective to move said second gate plate toward said first gate plate when said members are in assembled relation, said gate plates being so disposed that when said container is assembled said gate plates are positioned in operative relation to each other and the film therebetween.

11. In a film magazine, a container having two members, a first of said members including a flat side wall and edge walls extending at right angles therefrom, one of said edge walls having an aperture, a second of said members being adapted to complete a protective enclosure of a film within said magazine, a delivery support for a film, a take-up support for the film, a first gate plate, said first gate plate being apertured and disposed in alignment with said aperture in said edge wall, the film passing from said delivery support to said take-up support along said gate plate and past the aperture thereof, a resilient support for said apertured gate plate for moving said apertured gate plate toward said adjacent edge wall of said container, said support being mounted upon said first member, a second or presser gate plate, and a resilient support for said second plate disposed upon said second member of said container and effective to move said presser plate toward a film in operative relation to said first or apertured gate plate, said resilient supports being so placed upon said members that when said members are joined to complete the enclosure of said container said gate plates are disposed in operative and parallel relation to each other and a film therebetween.

12. In a film magazine including a container having a body member and a cover member which when closed and in assembled relation have two side walls held in spaced parallelism by edge walls one of which is apertured, a first or apertured gate plate mounted within the magazine upon one of said side walls adjacent said apertured front wall with said apertures coinciding, said gate plate being in the form of a letter U with one leg of the U disposed adjacent said apertured edge wall and having a coinciding aperture, a spring for moving said gate plate toward said apertured edge wall, a presser gate plate, resilient means for mounting said presser plate upon the other side wall of said container therewithin, said mounting means being so disposed that when said container is closed said presser gate plate and said mounting means are positioned within said U, said resilient mount forcing said presser plate into operative relation with said U shaped or apertured plate and a film in operative relation therewith.

13. In a film magazine including a container having a body member and a cover member which when closed and in assembled relation have two side walls held in spaced parallelism by edge walls one of which is apertured, a first or apertured gate plate mounted within the magazine upon one of said side walls adjacent said apertured front wall, said gate plate being in the form of a letter U with one leg of the U disposed adjacent said apertured edge wall and with its aperture disposed in line with that in said edge wall, a presser plate, and a resilient mount for said presser plate upon the other side wall of said container therewithin, said mount being so disposed that when said container is closed said presser gate plate and said mounting means are positioned within said U, said resilient mount forcing said presser plate into operative relation with said U-shaped or apertured plate and a film in operative relation therewith.

14. In a film magazine including a container having a body member and a cover member which when closed has two side walls held in spaced parallelism by edge walls, a front edge wall being apertured, one of said side walls being a part of one of said body members and the other of said side walls being a part of the other thereof, a first or front or apertured gate plate, a second or rear or presser gate plate, said gate plates being mounted upon different of said side walls for bodily movement therewith and extending therefrom toward the interior of said magazine, said front gate plate generally resembling a letter U, the front leg of said U extending away from the bottom wall with which said gate plate is bodily movable in a direction normal thereto and being apertured and being disposed adjacent the front edge wall of said magazine which contains said aperture, said apertures coinciding, the backwardly extending cross bar of said U being normal to said front leg and disposed parallel to and adjacent said side wall and serving as an edge guide for a film, and the rear leg of said U extending in a direction normal to said cross bar and parallel to said first leg and in the same direction from said cross bar, resilient means engaging said rear leg for moving said gate plate forwardly or toward said apertured edge wall, and a resilient mount for said presser plate extending from said side wall of said container opposite and parallel to that adjacent which said cross bar of said front gate plate is disposed, the resilience of said mount tending to move said presser plate toward said apertured edge wall and being of less magnitude than that of said resilient means engaging said rear leg of said front gate plate, said mount being so located that when said container is assembled said mount and said presser plate extend within the open space of the body of said U with the film engaging side of said presser plate disposed in operative and parallel relation to the film contacting portion of said first leg of said apertured gate plate and a film disposed therebetween.

15. In a film magazine including a container having a body member and a cover member which when closed has two side walls held in spaced parallelism by edge walls, a front edge wall being apertured, a first gate plate disposed upon one of said members in line with said aperture and having a corresponding aperture, a second gate plate, and means for resiliently suspending said second gate plate upon said side wall of said member other than that upon which said first gate plate is disposed for bodily movement therewith and resilient movement relatively thereto, said mounting means extending from said side wall toward the interior of said magazine behind the aperture of said edge wall whereby said second gate plate is resiliently suspended from said container member in line with said first gate plate.

16. In a film magazine including a container having a body member and a cover member which when closed has two side walls held in spaced parallelism by edge walls, a front edge wall being apertured, a first gate plate disposed upon one of said members in line with said aperture and having a corresponding aperture, a second gate plate, and a resilient mount for suspending said second gate plate upon said side wall of said member other than that upon which said first gate plate is disposed for bodily movement therewith and resilient movement relatively thereto, said mounting means extending from said side wall toward the interior of said magazine behind the aperture of said edge wall and having a point of attachment to said second gate plate above its center, whereby said second gate plate is resiliently suspended from said container member opposite said first gate plate but with its edge relatively distant from said edge wall tilted by gravity away from said second plate thus upon the assembly of said container facilitating the operative engagement of said plates.

17. In a film magazine including a container having a body member and a cover member which when closed has two side walls held in spaced parallelism by edge walls, a front of said edge walls being apertured, guides for directing a film past said aperture, said guides being disposed upon one of said members, a presser gate plate, and means for resiliently suspending said presser gate plate upon said side wall of said member other than that upon which said guides are disposed for bodily movement therewith and resilient movement relatively thereto, said suspending means depending from said side walls toward the interior of said magazine behind the aperture of said edge wall, whereby said second gate plate is resiliently suspended from said container in line with the aperture in said front edge wall.

18. In a film magazine including a container having a body member and a cover member which when closed has two side walls held in spaced parallelism by edge walls, a front edge wall being apertured, a gate plate, and a leaf spring, said spring being mounted upon one of said side walls for bodily movement therewith and resilient movement relatively thereto and extending therefrom in a direction normal thereto toward the interior of said magazine behind the aperture of said edge wall, said gate plate and said spring having cooperating formations by which said gate plate is supported by said leaf spring as well as given resilience thereby and suspended from said container member in line with said aperture and parallel to the edge wall in which it is formed.

19. In a film magazine including a container having a body member and a cover member which when closed has two side walls held in spaced parallelism by edge walls, a front of said edge walls being apertured, a gate plate, and a leaf spring, said spring being mounted upon one of said side walls for bodily movement therewith and resilient movement relatively thereto and extending therefrom in a direction normal thereto toward the interior of said magazine behind the aperture of said edge wall, said spring being formed with forwardly extending cut out portions and said gate plate being formed with hook like backwardly extending formations so that said gate plate may be bodily suspended upon said leaf spring as well as given resilience thereby, said spring being so disposed that said gate plate is suspended from said container member thereby in line with said aperture and parallel to the edge wall in which it is formed.

20. In a film magazine having side walls and an apertured edge wall, a gate plate, said gate plate having a first or film engaging portion disposed parallel to said edge wall containing said aperture, a second portion extending at right angles from said first portion and so disposed that it engages an edge of a film the flat surface of which is engaged and guided by said first portion of said gate plate, a third portion extending from said first section at right angles therefrom but in a direction away from the film, a bracket extending from one of said side walls in a direction the same as that in which said first section of said gate plate extends and parallel thereto and spaced therefrom away from the film, said third portion of said gate plate extending through an opening in said bracket whereby it is guided and supported thereby, said bracket being formed with such an opening, and a spring disposed between said bracket and said gate plate for moving said gate plate in a direction away from said bracket.

21. In a film magazine having side walls and an apertured edge wall, a gate plate, said gate plate having a first or film engaging portion disposed parallel to said edge wall containing said aperture and opposite said aperture, a second portion extending from said first portion at right angles thereto but in a direction away from the film, a bracket extending from one of said side walls in a direction the same as that in which said first section of said gate plate extends and parallel thereto and spaced therefrom away from the film, said second portion of said gate plate extending through an opening in said bracket whereby it is guided and supported thereby, said bracket being formed with such an opening, and a spring disposed between said bracket and said gate plate for moving said gate plate in a direction away from said bracket.

22. In a gate for a film magazine including a container which has at least one side wall and edge walls normal thereto, one of said edge walls having an aperture, said gate including a movable front apertured plate, said gate plate having a portion normal to said side wall of said container and having a film contacting surface disposed parallel to and adjacent said apertured edge wall, a backwardly extending portion normal to said film contacting surface disposed parallel to and adjacent said side wall and with its surface relatively distant from said side wall and serving as an edge guide for the film, and a third formation normal to said second surface and extending parallel to said first section and in said same direction from said second mentioned portion, and resilient means engaging the side of said third section relatively distant from said aperture for moving said gate member forwardly or toward said apertured edge wall.

23. In a gate for a film magazine adapted for use in a film handling apparatus, said magazine including a container which has at least one side wall and edge walls normal thereto, one of said edge walls having an aperture, said gate including a movable front apertured plate, said gate plate having a portion normal to said side wall of said container and having a film contacting surface disposed parallel to and adjacent said apertured edge wall, a backwardly extending portion normal to said film contacting surface disposed parallel to and adjacent said side wall and with its surface relatively distant from said side wall serving as an edge guide for the film, a third formation normal to said second surface and extending parallel to said first section and in said same direction from said second mentioned portion, resilient means engaging the side of said third section relatively distant from said aperture for moving said gate member forwardly or toward said apertured edge wall, and means cooperating with a fixed part of said apparatus and said gate for predeterminedly positioning said gate in relation to said apparatus.

24. A gate for use in a motion picture device, said gate including two sections, a first or apertured section being in the form of the letter U, said first section comprising a front upright leg which contains an aperture past which a film moves, a cross piece extending backwardly therefrom at right angles thereto and so disposed as to engage an edge of the film, and a second upright leg extending from said cross piece in the same direction as said first upright and parallel thereto, and a second or presser gate plate, a mount for said second plate extending within said U of said first plate, and a spring engaging said second plate for maintaining it in contaut with a film disposed along said front upright leg of said first section.

25. A gate for use in a motion picture device, said gate including two sections at least one of which is movable; a first or apertured section being in the form of the letter U, said first section comprising a front upright which contains an aperture, a cross piece extending therefrom at right angles thereto and so disposed as to engage an edge of the film and a second upright extending from said cross piece in the same direction as said first upright and parallel thereto; and a second or presser gate plate, and a mount for said second plate extending within said U-shaped portion of said first plate and adapted to maintain said presser plate in parallel and adjacent relation to said first plate and the film therebetween; and a spring for moving one of said plates toward the other.

26. A gate for use in a motion picture device, said gate including two sections, each movable, a first or apertured section being in the form of the letter U, said first section comprising a forward upright leg which contains an aperture past which a film moves, the inner side of said leg furnishing a film engaging surface, a cross piece representing the base of the U extending backwardly therefrom at right angles thereto, and a second or rearward upright leg extending from said cross piece at right angles thereto, a second or presser gate plate, said second gate plate being disposed within said U between said parallel legs thereof, a first spring engaging said second plate on the side relatively distant from said film engaging portion of said front upright leg and the relatively adjacent surface of said second leg of said U for maintaining said second gate plate in operative relation to a film which passes between said film contacting portion of said U and said second gate plate, and a second spring engaging the side of said second leg of the U opposite that engaged by said first spring for impelling said U forwardly.

27. In a film handling apparatus, an enclosing casing, said casing comprising a body member and a cover member, means for supporting a delivery coil of film in said body member, means therewithin for supporting a take-up coil, a first gate plate disposed between said coils within said body member past which the film is drawn, a second gate plate mounted upon said cover member, means mounted upon said casing and effective during a first part of the movement of said cover member toward protective relation to said body member to move said gate plates away from operative engagement with each other and with a film therebetween, means mounted upon said casing and effective during the major portion of said closing operation to hold said gate plate away from the film until the film engaging surface of both of said gate plates are opposite each other, and means mounted upon said casing for positioning said gate plates in operative engagement with each other and a film therebetween when said closing operation has been substantially completed.

28. In a film handling apparatus, two supports movable from and to an assembled relation with each other wherein they protect a film disposed therebetween, a first gate plate, a second gate plate, a mount for said first gate plate upon one of said supports, a mount for the other of said gate plates upon the other of said supports, one of said mounts being resilient, said mounting means being so disposed upon said respective supports that when said main supports are placed in assembled relation with each other said gate plates operatively engage a film disposed therebetween, movement of said supports toward and away from each other being in a direction parallel to the film engaging surfaces of said gate plates, means effective during and made operative by the movement of said supports into operative position for bodily moving one of said gate plates away from the other thereof, and means for moving said gate plates into operative engagement with each other after said movement has been completed.

29. In a film handling apparatus, two supports movable from and to an assembled relation with each other wherein they protect a film disposed therebetween, a first gate plate, a second gate plate, a mount for said first gate plate upon one of said supports, and a mount for the other of said gate plates upon the other of said supports, one of said mounts being resilient, said mounting means being so disposed upon said respective supports that when said main supports are placed in assembled relation with each other said gate plates operatively engage a film disposed therebetween, movement of said supports toward and away from each other being in a direction parallel to the film engaging surfaces of said gate plates, and means effective during and made operative by the movement of said supports into operative position for bodily moving one of said gate plates away from the other thereof.

30. A gate for use in a film handling apparatus, said gate including a first gate plate with a film-engaging surface, a second and co-operating gate plate with a film-engaging surface, said surfaces being relatively adjacent and adapted to engage a film therebetween, a mount for said second gate plate upon which it is movable relatively to said second gate plate in a direction parallel to the film engaging surfaces of each, a spring for impelling said second gate plate toward said first gate plate and a film disposed therebetween, a fixed member operatively engaging said first gate plate as it is moved into cooperative relation with the other for first camming said gate plate against the power of said spring away from said second gate plate and the film so that there is no interference therebetween and then for releasing said spring when said gate plates are spaced from but opposite each other so that the power of said spring is released and impells said second gate plate toward the film and said second gate plate.

31. In a gate for a motion picture apparatus, a first apertured film contacting plate, a second or presser plate, a different support for each of said plates, means for resiliently mounting one of said plates upon its support, one of said supports being bodily movable in relation to the other thereof in a direction parallel to the film contacting surface of said plates and normal to the line of travel of a film through said gate, said plates being so disposed upon said mounts that when said supports are moved into assembled relation with each other said plates are positioned in operative parallel and closely adjacent relation to each other and to a film therebetween, control means operatively interconnected with one of said supports and one of said plates and mounted upon said apparatus for moving one of said plates away from the other thereof so that it clears a film disposed adjacent said other gate plate when said supports are being moved to assembled relation, and means for moving said plates into operative relation with each other and with the film therebetween after said operation has been completed.

32. In a gate for a motion picture apparatus, a first apertured film contacting plate, a second or presser plate, said plates having oppositely disposed film contacting surfaces, a different support for each of said plates, means for resiliently mounting one of said plates upon its support for movement toward the other thereof, one of said supports being bodily movable in relation to the other thereof in a direction parallel to the film contacting surface of said plates and normal to the line of travel of a film through said gate preparatory to a film feeding operation, said plates being so disposed upon said mounts that when said supports are moved into assembled relation with each other said plates are positioned in operative parallel and closely adjacent relation to each other and to a film therebetween, co-operating formations upon each of said gate plates which upon the first portion of said parallel movement of one of said plates cams said resiliently mounted plate away from the other plate and a film disposed therebetween so that further movement does not interfere with the film and during the latter portion of said movement releases said resiliently mounted gate plate so that it moves into adjacent and operative relation with the film and said other gate plates.

33. In a film magazine, a body member and a cover member which when assembled form a container for protecting a film therewithin, said container having side walls held in spaced parallelism by edge walls, one of said edge walls being apertured, a first and apertured gate plate, a spring mount for said gate plate disposed upon an inside surface of one of said container members adjacent said apertured wall and effective to move said first gate plate toward said aperture, a second or presser gate plate, and a spring mount for said second plate disposed upon an inside surface of one of said members and effective to move said second gate plate toward said first gate plate when said members are in assembled relation, the magnitude of the springs of said mounts being different, said resilient mounts being so disposed that when said container is assembled said gate plates are disposed in parallel, opposite and adjacent relation to each other and to a film therebetween, and a formation mounted upon said member other than that upon which said mount of lesser resilience is disposed for operatively engaging said gate plate upon the mount with a spring of lesser resilience and effective for moving it away from said other gate plate and a film disposed adjacent thereto against the power of the spring of its mount during the assembly of said body members.

34. In a film magazine for interchangeable insertion within and withdrawal from a plurality of film handling apparatus, said magazine including a container comprising a body member and a cover member which when assembled with each other form a protective casing for a film therewithin, a two plate gate, means for mounting a first of said gate plates upon one of said members upon an inside surface thereof, means for mounting the second of said gate plates upon the other of said members, one of said mounting means being resilient and said mounting means being so disposed that when said casing is assembled said plates are placed in operative and parallel relation to each other and to a film therebetween, and operating means mounted upon said magazine and engaging said second gate plate as said container is being assembled for first sliding it away from said first gate plate and then releasing it whereby its resilience moves it so that it engages a film placed between said gate plates.

35. In a film magazine for interchangeable insertion within and withdrawal from a plurality of film handling apparatus, said magazine including a container comprising a body member and a cover member which when assembled with each other form a protective casing for a film therewithin, a two plate gate for holding a film therewithin, means for mounting a first of said gate plates upon one of said members upon an inside surface thereof, means for mounting the second of said gate plates upon the other of said members, one of said mounting means being resilient, and means engaging said second gate plate as said container is being assembled for sliding it away from said first gate plate so that during the operation of assembly it clears said second gate plate and a film laid adjacent thereto.

36. In a film magazine including a container comprising a body member and a cover member, a front or apertured gate plate, a rear or presser gate plate, means for resiliently mounting one of said plates upon one of said body members, means for mounting the other of said plates upon the other of said members, said mounting means being so disposed that when said container is assembled by the joining of said body members said gate plates are disposed in operative relation to each other and to a film therebetween, and means operatively engaging one of said gate plates and made effective by the joining of said body members for moving one of said gate plates away from the other thereof.

37. In a film magazine, a two part container, said container comprising a body member and a cover member, said members when assembled in protective relation having side walls held in spaced parallelism by edge walls one of which is apertured, a first or front gate plate mounted upon said body member adjacent and parallel to said apertured edge wall, a film being positioned along the inner face of said front gate plate, a second or presser gate plate resiliently mounted upon said cover member and so disposed that when said cover is placed in protective relation to said body member said gate plates are positioned in operative and parallel engagement to each other and to the film therebetween, said second gate plate having at each edge thereof relatively adjacent the bottom side wall of said container a positioning tongue which extends therefrom in a direction generally parallel to the film path, a positioning post disposed adjacent said first plate but rearwardly therefrom in a direction along the optical axis at a distance of at least the thickness of the film and of said second plate, said posts having cut out portions or notches adjacent each lower edge thereof relatively adjacent to said bottom side wall of said magazine, said notches being so dimensioned that said tongues can pass through them, said tongues and said posts and cut out notches being so disposed that when said tongues are placed back thereof and said cover member moved into assembled or protective relation with said body member said tongues first engage said posts and move said second gate plate backwardly away from the film until they reach said notches and pass therethrough, said gate plate thereupon being moved forward by said resilient mounting into operative contact with the film.

38. In a gate for use in a film handling device, a first or front gate plate mounted upon one or a first support, a film being positioned along the inner face of said front gate plate, a second or presser gate plate resiliently mounted upon another or second support, said supports being mounted for movement toward each other into operative position in a direction parallel to the film engaging surfaces of said gate and being so disposed that when said supports are moved together said gate plates are positioned in operative and parallel engagement to each other and to the film therebetween, said second gate plate having at each edge thereof relatively distant from said second support a positioning tongue which extends therefrom in a direction generally parallel to the film path, a positioning post disposed adjacent said first plate but rearwardly therefrom in a direction along the optical axis at a distance of at least the thickness of the film and of said second plate, said posts having cut out portions or notches adjacent each lower edge thereof relatively adjacent said first support, said notches being so dimensioned that said tongues can pass through them, said tongues and said posts and cut out notches being so disposed that when said tongues are placed back thereof and said supports moved into operative position said tongues first engage said posts and move said second gate plate backwardly away from the film until they reach said notches and pass therethrough, said gate plate thereupon being moved forward by said resilient mounting into operative contact with the film.

39. In a film magazine, a two part container, said container comprising a body member and a cover member, said members when assembled in protective relation having side walls held in spaced parallelism by edge walls one of which is apertured, a first or front gate plate mounted upon said body member and having a film guiding surface adjacent and parallel to said apertured edge wall, a film being positioned along the inner face of said front gate plate, a second or presser gate plate resiliently mounted upon said cover member and so disposed that when said cover is placed in protective relation to said body member said gate plates are positioned in operative and parallel engagement to each other and to the film therebetween, said second gate plate having at each edge thereof relatively adjacent the bottom side wall of said container a positioning tongue which extends therefrom in a direction generally parallel to the film path, a positioning post mounted upon each end of said first plate but rearwardly from the film guiding surface thereof and parallel thereto at a distance of at least the thickness of the film and of said second plate, said posts having cut out portions or notches adjacent each lower edge thereof relatively adjacent said bottom side wall of said magazine, said notches being so dimensioned that said tongues can pass through them, said tongues and said posts and cut out notches being so disposed that when said tongues are placed back thereof and said cover member moved into assembled or protective relation with said body member said tongues first engage said posts and move said second gate plate backwardly away from the film until they reach said notches and pass therethrough, said gate plate thereupon being moved forward by said resilient mounting into operative contact with the film.

40. In a gate for use in a film handling device, a first or front gate plate mounted upon one or a first support, a film being positioned along the inner face of said front gate plate, a second or presser gate plate resiliently mounted upon another or second support, said supports being mounted for movement toward each other into operative position in a direction parallel to the film engaging surfaces of said gate, and said plates being so disposed that when said cover is placed in protective relation to said body member said gate plates are positioned in operative and parallel engagement to each other and to the film therebetween, said second gate plate having at each edge thereof relatively distant from said second support a positioning tongue which extends therefrom in a direction generally parallel to the film path, a positioning post mounted upon each end of said first plate but rearwardly from the film guiding surface thereof and parallel thereto at a distance of at least the thickness of the film and of said second plate, said posts having cut out portions or notches adjacent each lower edge thereof relatively adjacent said first support, said notches being so dimensioned that said tongues can pass through them, said tongues and said posts and cut out notches being so disposed that when said tongues are placed back thereof and said supports moved into operative position said tongues first engage said posts and move said second gate plate backwardly away from the film until they reach said notches and pass therethrough, said gate plate thereupon being moved forward by said resilient mounting into operative contact with the film.

41. A gate plate for use in a film handling apparatus, said gate plate embodying a surface adapted to engage a side of a moving film and a surface at right angles thereto adapted to engage an edge of said film, and a positioning post attached to each end of said edge guiding surfaces but spaced away from the area engaged by an edge of the film but on the side of said plate engaged by the side of the film and parallel thereto but spaced therefrom, said posts being adapted to cooperate with positioning formations upon each edge of a presser plate designed for use with said gate plate.

42. In a film magazine, a two part container, said container comprising two members, said members when assembled in protective relation having side walls held in spaced parallelism by edge walls one of which is apertured, the movement of said members into assembled relation being in a direction parallel to said edge walls, means mounted upon said one of said members for guiding a film past the aperture of said edge wall and parallel and closely adjacent to the inner surface of said wall, a presser gate plate, a resilient mount therefor upon the other of said members and so disposed that when said members are moved into assembled relation by said parallel movement said gate plate is disposed opposite and parallel to the plane of said operative area and said edge wall, a positioning formation fixed within the container adjacent the position occupied by said presser gate plate when it is in operative relation to the film, a positioning formation extending from said presser gate plate, said formations being so shaped and disposed that when said members are moved into assembled or protective relation with each other said formations engage and first move said presser gate plate backwardly away from the film until it has been positioned in its movement toward operative relation substantially opposite the operational area of the film and thereupon release the resilience of said mount so that it moves said gate plate into operative relation with the film.

43. In an interchangeable film magazine for use successively in a plurality of different film handling apparatus, said magazine including a body member and a cover member, one of said members slipping within another and said members when joined forming an enclosure which protects a film housed therewithin during storage, handling or transportation and supports it in operative position when the magazine is disposed within said apparatus for projection or exposure, a two-plate gate, means for fixedly mounting one of said gate plates upon one of said members, means for resiliently mounting the other of said gate plates upon the other of said members for movement toward said first gate plate, said mounting means being so arranged that when said members are joined said gate plates are disposed within said container and in operative and parallel relation to each other and to a film therebetween.

44. In a film magazine, a body member and a cover member which when assembled form a container for protecting a film therewithin, said container having flat side walls held in spaced parallelism by edge walls, one of said edge walls being apertured, a first and apertured gate plate, said first gate plate being rigidly mounted upon the flat side wall of the one of said members which has said aperture adjacent and parallel to said edge wall containing an aperture, said apertures being in alignment, a second or presser gate plate, a mount for said second plate disposed upon the said side wall of said other member, said second plate extending from said side wall upon which it is mounted in a direction normal thereto, means operatively engaging said presser gate plate and rendered operative by and during the movement of said members for moving said second gate plate away from a film disposed adjacent said first gate plate and so maintaining it during said movement, and means for moving said second or presser gate plate toward said first or apertured gate plate when said members are in assembled relation, said resilient mount being so disposed that when said container is assembled said gate plates are disposed within said container and in operative relation to each other and to a film therebetween.

SIGRID FOSTER.
WARREN DUNHAM FOSTER.

REFERENCES CITED

The following references are of record in the file of this patent:

UNITED STATES PATENTS

| Number | Name | Date |
|---|---|---|
| 1,823,462 | Morsbach | Sept. 15, 1931 |

FOREIGN PATENTS

| Number | Country | Date |
|---|---|---|
| 158,242 | Great Britain | Jan. 15, 1921 |
| 705,299 | France | Mar. 3, 1931 |